United States Patent [19]
Bray et al.

[11] Patent Number: 5,161,189
[45] Date of Patent: Nov. 3, 1992

[54] ENCRYPTION AND DECRYPTION OF CHAINED MESSAGES

[75] Inventors: Michelle M. Bray, Streamwood; Michael W. Bright, Arlington Heights; Hans C. Sowa, Schaumburg, all of Ill.

[73] Assignee: Motorola, Inc., Schaumburg, Ill.

[21] Appl. No.: 667,151

[22] Filed: Mar. 11, 1991

[51] Int. Cl.⁵ ............................................. H04L 9/02
[52] U.S. Cl. ...................................... 380/21; 380/43; 380/48
[58] Field of Search ...................... 380/20, 21, 43, 48, 380/49

[56] References Cited
U.S. PATENT DOCUMENTS
4,924,513  5/1990  Herbison et al. .................... 380/21

Primary Examiner—Tod R. Swann
Attorney, Agent, or Firm—Susan L. Lukasik; Raymond A. Jenski; Steven G. Parmelee

[57] ABSTRACT

A single sync field (501) and multiple messages or message segments (503, 507, 511, and 515) are chained (407) together and encrypted (407) as a whole. When this encrypted chained message is received, it is decrypted as a whole (605), or in part (613) by setting up (609) and filling (611) a holding register with the encryption state of the encrypting device.

23 Claims, 3 Drawing Sheets

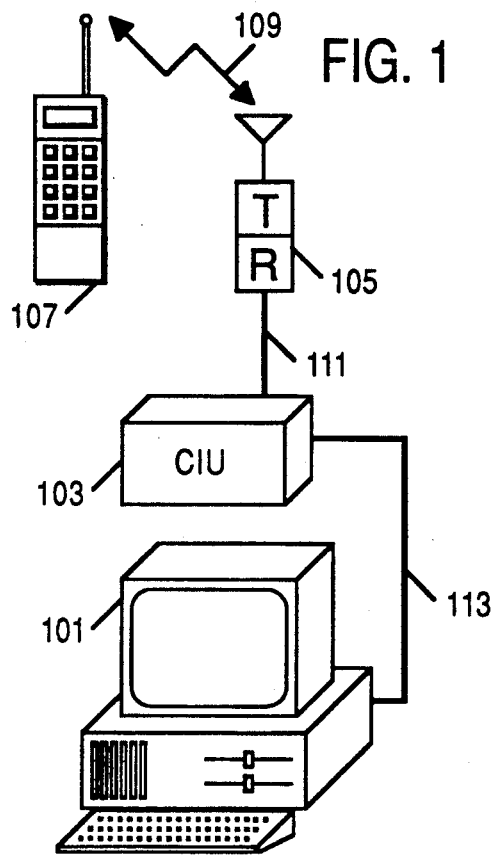
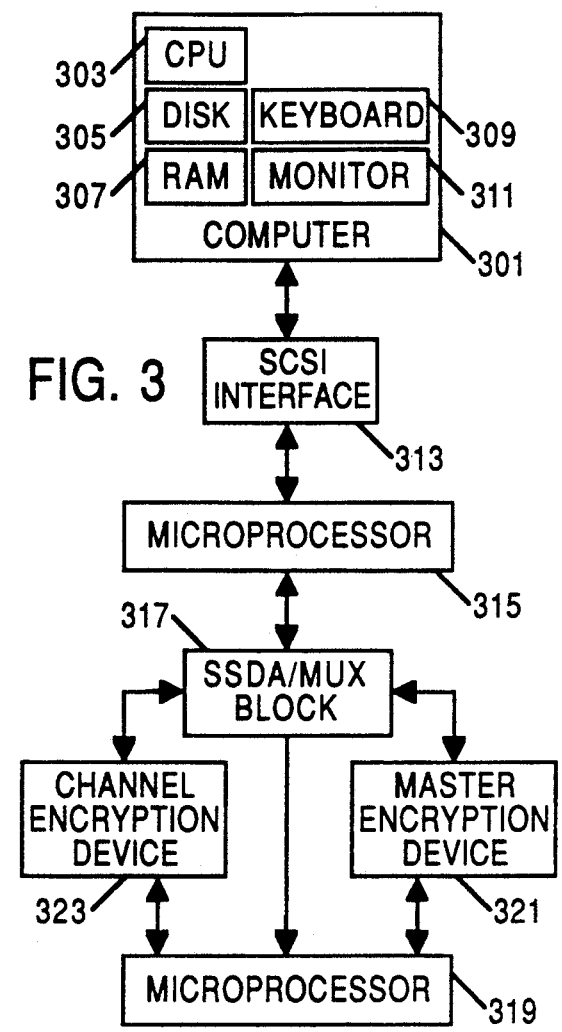
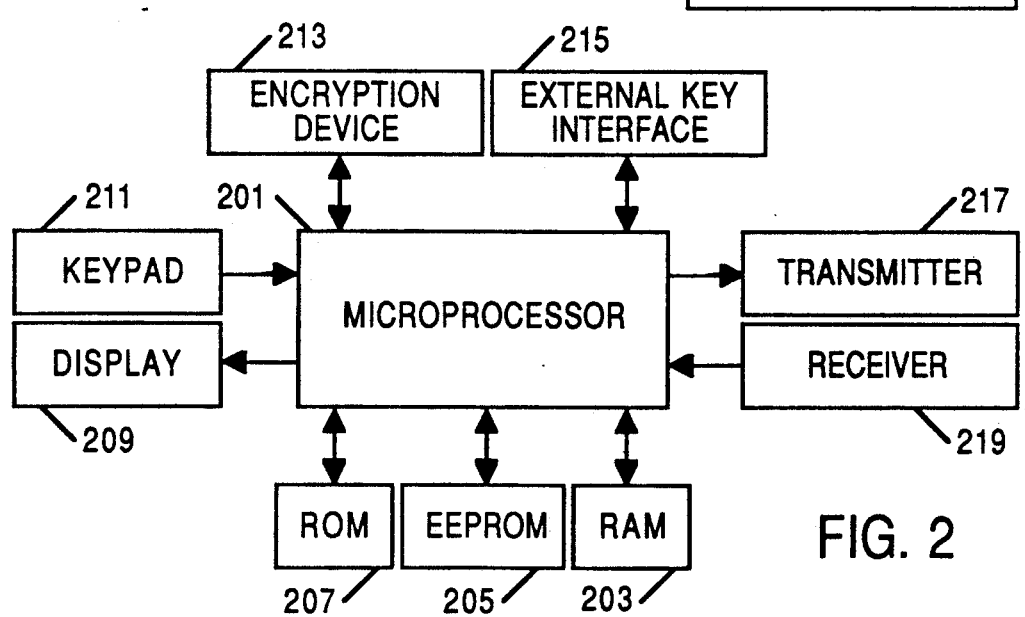
FIG. 1
FIG. 3
FIG. 2

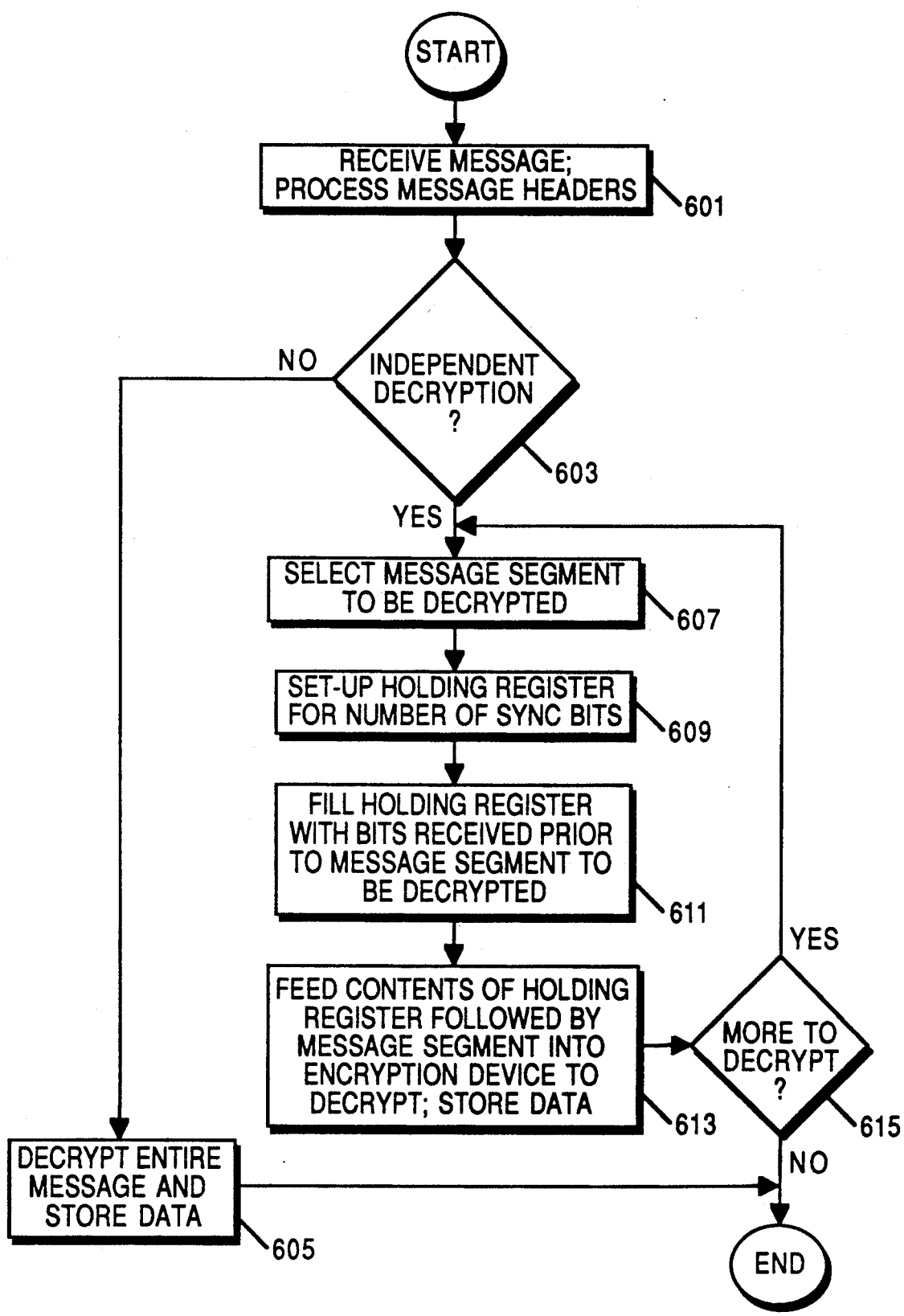

ENCRYPTION AND DECRYPTION OF CHAINED MESSAGES

FIELD OF THE INVENTION

This invention relates to encrypted communication systems. More particularly, this invention relates to key management in an encrypted communication system.

BACKGROUND OF THE INVENTION

Encrypted voice and data systems are well known. Many of these systems provide secure communication between two or more users by sharing one piece of information between the users, which permits only those users knowing it to properly decrypt the message. This piece of information is known as the encryption key variable, or key for short. Loading this key into the actual encryption device in the secure communication unit is a basic requirement that enables secure communication.

In addition to having the same encryption key to decrypt an encrypted message, both the encrypting and decrypting encryption devices must be identical, i.e. perform the same encryption algorithm in the same way and be in the same (internal) encryption state. Synchronization (also known as sync) data is sent over the communication channel to enable the decrypting device to line up its encryption state with the encryption state of the encrypting device, after which proper decryption of the incoming message is performed.

There are several different types of synchronization. One particular type is a self-synchronization, also known as cipher feedback. If two devices have different encryption states initially but have an identical encrypted stream fed into them, after a certain number of bits are entered into the devices (dependent on the length of the internal registers in the encryption device), they will both self-synchronize to the encryption state of the encrypting device and output the same decrypted information. Sending out sync data prior to the message helps the receiving device synchronize without loss of data.

To retain security over a long period of time, the keys are changed periodically, typically weekly or monthly. Loading new keys, called rekeying, can be done in various ways. One method is over-the-channel rekeying, which is achieved by transmitting encrypted keys from a central keyloading site to the units in the communication group over a typical channel. When over-the-channel rekeying is performed, a rekeying message for one encryption key contains the encrypted key and the field of synchronization used to encrypt that key to prevent data loss due to self-synchronization. In a system where ten keys are to be sent to a communication device, ten sync fields and ten key fields must be transmitted. For some encryption devices, twice the number of key bits may be needed as sync bits. For example, 256 bits of sync may be needed to synchronize 144 bits of key. For ten encryption keys to be sent, 4000 bits total are needed, and 64% are used just to synchronize the data.

It is apparent that an approach to synchronizing multiple encrypted messages while saving transmission bandwidth without loss of data is essential.

SUMMARY OF THE INVENTION

The invention encompasses an apparatus for and method of communication of at least two message segments in an encryption system having an encryption device and a decryption device. A data stream and the at least two message segments are chained together into a chained message. The chained message is then encrypted. The encrypted chained message is transmitted to the decryption device. The encrypted chained message is received at the decryption device. The encrypted chained message is then decrypted.

BRIEF DESCRIPTION OF THE DRAWINGS

FIG. 1 is a block diagram of a communication system with key management in accordance with the present invention.

FIG. 2 is a block diagram of a communication unit in accordance with the present invention.

FIG. 3 is a block diagram of a KMC in accordance with the present invention.

FIG. 6 is a flowchart showing decryption of rekeying messages in accordance with the present invention.

DESCRIPTION OF A PREFERRED EMBODIMENT

Figure 4:
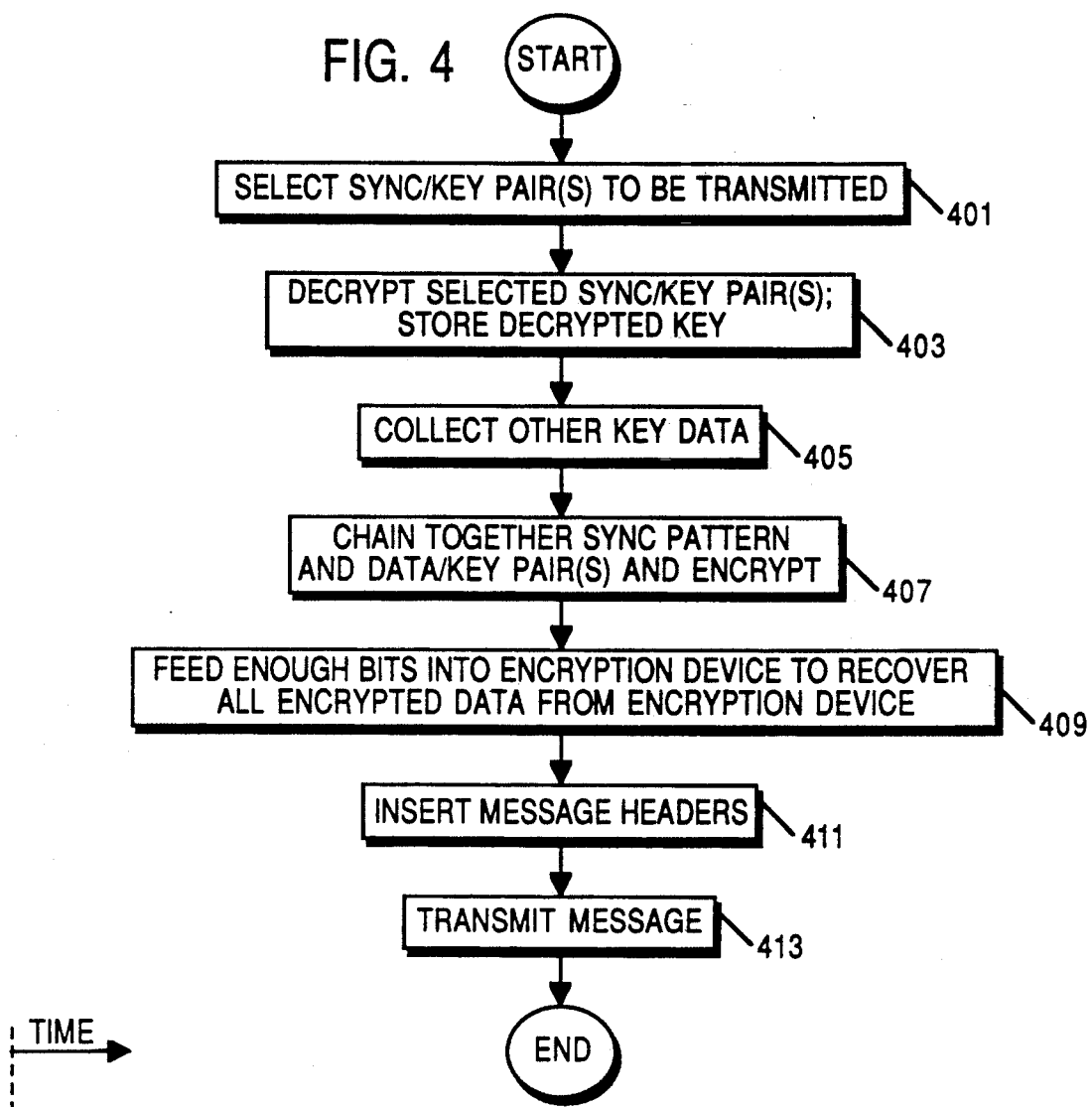
FIG. 4 is a flowchart showing encryption of rekeying messages in accordance with the present invention.

The following describes a method and apparatus for limiting the amount of bandwidth necessary to transmit an encrypted series of data packets by removing interleaved synchronization data between continuously transmitted messages and decrypting that message while properly synchronizing with the transmitted bits so no important data is lost. An advantage of the invention is the ability to independently decrypt a segment of an encrypted data message without having to decrypt the entire message at one time, thus saving time, energy, and necessary RAM storage.

In the preferred embodiment, an over-the-channel rekey system is used to transmit encryption keys and other related information to communication units in a secure communication system. This system includes a Key Management Controller (KMC) which comprises a database that records communication unit IDs (identifications), encrypted keys, and which units have/need what keys, and is a central control point for distributing this data over the communication channel. See FIG. 3 for further information on KMC hardware. The communication units include a mobile radio, such as a Syntor X 9000 with Over the Air Rekeying (OTAR)/multikey option, a portable radio, such as a Systems Saber with Over the Air Rekeying (OTAR)/multikey option, and a Console Interface Unit (CIU) with Over the Air Rekeying (OTAR)/multikey option. All are available from Motorola, Inc.

When the system operator rekeys the communication units in the system, as shown in FIG. 1, he/she sends a rekeying message over a typical communication channel 109, in this case an RF channel, using the KMC 101. The KMC 101 performs the necessary operations to assemble and encrypt the proper information and transfers this information as a rekeying message across a communication channel 113, in this case a phone line, at speeds up to 9600 baud to the CIU 103. A conventional data modem may be used to transfer data from the KMC 101 to the CIU 103 across the communication channel 113. The CIU 103 transforms the data from the KMC 101 to a 1200 baud MSK (Minimum-Shift Keying) signal suitable for transmission across a communication channel 111 to a base station 105, such as an MSF5000 transparent base station available from Motorola, Inc., which transmits the data over the communication channel 109 to the communication units 107 in the system. For larger systems with multiple base stations and CIUs 103, a distribution panel can be added between the KMC 101 and multiple CIUs 103 in multiplex fashion, as is known in the art. Although 9600 baud and 1200 baud are used in the preferred embodiment, other successful data rates exist.

FIG. 2 is a block diagram of a communication unit. The communication unit performs encryption management functions in a microprocessor 201, such as an MC68HC11 microprocessor, available from Motorola, Inc. The microprocessor 201 uses ROM 207 to store program information, such as the instructions to perform the steps in a flowchart, EEPROM 205 to store customer options, and RAM 203 to store keys and key information, such as key ID (identification) or key tags to indicate the use for the key. The microprocessor 201 is instructed at times to indicate various messages to the operator on the communication unit's display 209. A keypad 211 is available for operator entry of instructions, such as key selection or index selection. The display 209 and keypad 211 are not part of the CIU 103, although a monitor with keypad may be attached to the CIU 103. An encryption (decryption) device 213 encrypts and decrypts data as required by the microprocessor 201. An external key interface 215 provides a mechanism for keys and key information to be directly downloaded from a KVL into a communication unit 107 such as a mobile, portable, or CIU 103. The external key interface 215 in the KVL receives keys and key information from the KMC 101 and downloads the keys and key information to the other communication units 107. A transmitter 217 and receiver 219 modulate and demodulate data, respectively, for the communication unit for the unit's respective channel, as is known in the art.

FIG. 3 is a block diagram of a KMC 101. The basic part of the KMC is a 68030-based computer 301 containing a CPU 303, storage disk 305, RAM 307, a keyboard 309 for entering commands externally, and a monitor 311 to output data. An example of such a computer is a VME 3400 computer, available from Motorola, Inc. Additional hardware is attached to the computer to provide encryption for data as needed. This hardware is attached through an SCSI (Small Computer System Interface) block 313, as is known in the art. A microprocessor 315, such as an MC68HC11 microprocessor available from Motorola, Inc., passes encrypted and unencrypted data between the computer 301 and SSDA/MUX (Synchronous Serial Data Adaptor/Multiplexor) block 317, which performs serial data transfer and multiplex functions to transfer data from a microprocessor 319, such as an MC68HC11 microprocessor available from Motorola, Inc., to the microprocessor 315. A master encryption device 321 provides encryption for data to be stored locally in the KMC and a channel encryption device 323 for encrypting/decrypting data which is transferred over the channel.

Before a decryption device reaches the self-synchronized state, the self-synchronized state occurring when the (internal) encryption state of the decryption device is synchronized to the (internal) encryption state of the encrypting device, the decryption device outputs a stream of random data bits which is discarded because it is the result of the internal self-synchronizing process and contains no useful information. The maximum amount of random data bits output before the decrypted input is first recovered is determined for an individual encryption device. A stream of random data bits, 256 bits in the preferred embodiment, equal to the maximum number of random bits before self-synchronization is encrypted immediately before encrypting the data to be transmitted. This encrypted stream of random data is regarded in the preferred embodiment as the synchronization (sync) data, which forces the encrypting device into a known internal state and, upon entering this encrypted stream into the decrypting device, causes the decrypting device to synchronize without loss of data. Each time an encrypted message is transmitted, it is preceded by a sync field which is comprised of the sync data to allow recovery of the data that was originally encrypted without loss of data. There must be no data input to the encryption device between the random data (which when encrypted becomes sync) and data to be encrypted/decrypted for the synchronization to be successfully carried out.

Figure 5A:
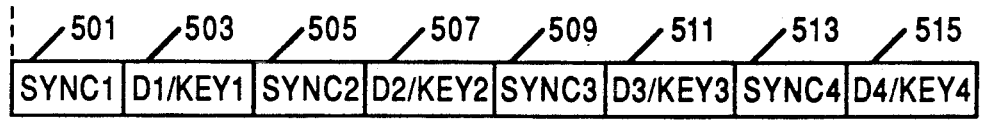
FIG. 5A is a bit field representation of chained rekeying messages.
Figure 5B:
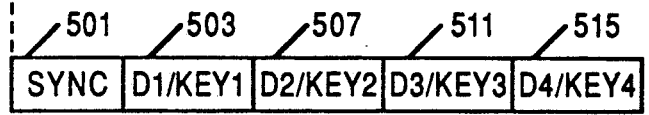
FIG. 5B is a bit field representation of encrypted chained rekeying data in accordance with the present invention.
Figure 5C:
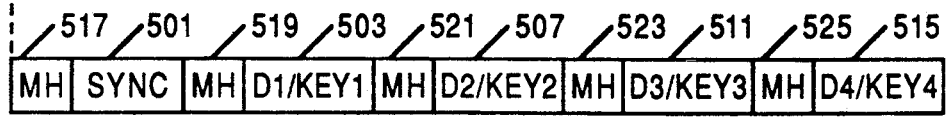
FIG. 5C is a bit field representation of chained rekeying messages in accordance with the present invention.

In the preferred embodiment, it is desired at times to transmit several rekeying messages in a single transmission. FIG. 5A is a bit field representation of chained rekeying messages, as would be formed previous to the invention. A first rekeying message would contain a first sync (SYNC1) 501 and the first data/key (D1/KEY1) information 503 encrypted following the first sync 501. A second rekeying message would contain a second sync (SYNC2) 505 and the second data/key (D2/KEY2) information 507 encrypted following the second sync 507. A third rekeying message would contain a third sync (SYNC3) 509 and the third data/key (D3/KEY3) information 511 encrypted following the third sync 509. A fourth rekeying message would contain a fourth sync (SYNC4) 513 and the fourth data/key (D4/KEY4) information 515 encrypted following the fourth sync 513. These messages would be transmitted in succession, as shown in FIG. 5A. In the preferred embodiment, the random data (to be encrypted into sync) is first chained together with the data/key information and is encrypted. FIG. 5B shows the result of encryption of this data chain. The sync field 501 is followed by the first encrypted data/key pair 503, the second encrypted data/key pair 507, the third encrypted data/key pair 511, and the fourth encrypted data/key pair 515. As can be seen by comparing FIG. 5A with FIG. 5B, there is a significant savings in transmission time, even with only four keys transmitted. In the preferred embodiment, a sync field 501 is comprised of 36 bytes, and any data/key field 503 is comprised of 21 bytes. Thus, a 108 out of 228 bytes have been saved, or 47% of the transmission time, which is a significant savings in bandwidth. In the preferred embodiment, a message header is transmitted with each sync field and each data/key field, as shown in FIG. 5C. Each message header 517, 519, 521, 523, and 525 is 12 bytes in length. Thus, the example message is 180 bytes in length. If it had not been constructed in the preferred manner, it would have been 324 bytes in length, thereby saving 44% of transmission time.

FIG. 4 is a flowchart showing encryption of rekeying messages as performed by the KMC 101. At step 401, each sync/key pair to be transmitted is selected. In the preferred embodiment, encryption keys are stored encrypted for additional security. The keys are stored with the appropriate sync data for decryption without loss of data. At step 403, each selected sync/key pair is decrypted. At step 405, other key data for each key is collected, such as key index, key name, address data, and other information, which is combined with the appropriate key to form a data/key pair. At step 407, the random data (to encrypted into sync) and data/key pair(s) are chained together and encrypted in succession, the result of which is shown in FIG. 5B, as discussed earlier. At step 409, enough bits are fed into the encryption device to recover all encrypted data from the encryption device, thus accounting for any throughput delays in the encryption device. At step 411, an appropriate message header is inserted before the sync field and before each data/key field, as shown in FIG. 5C. The message is transmitted to the CIU 103 at step 413, and the process ends. In the preferred embodiment, the message headers are not encrypted.

Further information about the data contained in a sync field, data/key field, and message header is contained in the following. Reference is made to U.S. Pat. No. 5,146,497 titled "Group Rekey in a Communication System," U.S. patent application Ser. No. 661,921 filed Feb. 27, 1991 titled "Authentication of Rekey Messages in a Communication System," U.S. patent application Ser. No. 662,582 filed Feb. 27, 1991, titled "Formation of Rekey Messages in a Communication System," and U.S. Pat. No. 5,150,408, titled "Key Distribution Communication System." All four U.S. Patent Applications were filed on Feb. 27, 1991 on behalf of Michael W. Bright, with the same assignee as the present invention. Information relating to key indexes and key indexing is described in U.S. patent application Ser. No. 07/583,268, filed on Sep. 17, 1990 on behalf of Michael W. Bright et al., with the same assignee as the present invention, titled "Key Management in Encryption Systems."

FIG. 6 is a flowchart showing decryption of rekeying messages as performed by the microprocessor 201 in the communication unit 107. At step 601, the (communication) unit receives the rekeying message, as shown in FIG. 5C, and processes the information in the message headers, thus the encrypted information, as shown in FIG. 5B, remains to be processed. If at step 603, independent decryption is not desired, the entire message is decrypted and the resultant data is stored at step 605, and the process ends. If at step 603, independent decryption is desired, the message segment, i.e. data/key field, to be decrypted is selected at step 607. At step 609, the microprocessor sets up a holding register in RAM 203 for the total number of sync bits required. At step 611, the holding register (for the encryption state) is filled with the bits of the message received (in the same order) immediately prior to the message segment selected for decryption. This storage of bits in the holding register at step 611 effectively enables the communication unit to store the encryption state of the encrypting device, since the bits stored are those output by the device immediately before the selected message segment. At step 613, decryption is performed by feeding the contents of the holding register followed immediately, i.e. no other data is entered into the decryption device, by the message segment to be decrypted, thus yielding the decrypted data (without data loss) which is stored. If there are throughput delays in the decrypting device, it will be necessary to feed into the decryption device the same number of bits as the length of the throughput delay to recover the data without loss. These bits are taken from the message segment received immediately after the message segment selected for decryption. If at step 615, more message segments are to be decrypted, the process continues with step 607, otherwise the process ends.

For example, if it is desired to decrypt the third data/key field 511 of FIG. 5B, the holding register would be set at step 609 for 36 bytes of sync for a total of 288 bits. When the holding register is filled at step 611, the 288 bits are comprised of the last 120 bits from the first data/key field 503 and all 168 bits of the second data/key field 507. This data is fed into the decryption device 213 at step 613, beginning with the 49th bit of the first data/key field 507 and continuing in order until the last bit of the third data/key field 515 is entered into the decryption device 213. In this example, there is a 2-bit throughput delay in the decryption device 213, so before any further data is entered into the decryption device 213, the first two bits of the fourth data/key field 515 are entered into the decryption device 213 to recover the last two bits of data of the third data/key field 511 from the decryption device 213. This recovered data is then stored without loss of data. In the case where it is desired to decrypt the last segment of the message and there is a throughput delay in the decryption device, the bits required to decrypt the message may be acquired by choosing random bits, which may yield erroneous data, by waiting for the next message to be received, which may at times yield erroneous data, or by encrypting an additional number of bits at the end of the message at the transmitter to allow recovery of these bits.

Successful implementations of the invention may incorporate use of data other than encryption keys or key data to be encrypted. This technique may take encrypted voice, encryption keys, control data, and other information in any combination, and successfully independently decrypt all the information in the manner described above. Successful implementations may include a shift register or other such hardware to implement the holding register.

What is claimed is:

1. A method of communication of at least two message segments in an encryption system having an encryption device and a decryption device, comprising the steps of:
   chaining a data stream and the at least two message segments together into a chained message;
   encrypting said chained message;
   transmitting said encrypted chained message to the decryption device;
   receiving said encrypted chained message at the decryption device; and
   independently decrypting any segment of said encrypted chained message, without decrypting any other segment of said encrypted chained message.

2. The method of communication of claim 1, said decrypting step further comprising the steps of:
   determining an encryption state for at least one of the at least two encrypted message segments; and
   decrypting said at least one of the at least two encrypted message segments by entering said encryption state followed by said at least one of the at least two encrypted message segments into the decryption device.

3. The method of communication of claim 2, wherein said determining step further comprises the steps of:
setting up a holding register for said encryption state;
filling said holding register with data from said encrypted chained message received immediately prior to receiving said at least one of the at least two encrypted message segments; and
feeding contents of said holding register into the decryption device.

4. The method of communication of claim 2, said decrypting step further comprising the step of entering message bits, received after reception of said at least one of the at least two encrypted message segments, into the decryption device to recover decryption device throughput delay data.

5. The method of communication of claim 1, further comprising the step of forming the at least two encrypted message segments from encryption key data.

6. The method of communication of claim 1, further comprising the step of generating said data stream by randomly selecting bits.

7. The method of communication of claim 1, said chaining step further comprising the step of placing said data stream and the at least two message segments for transmission in succession.

8. An encryption system having an encryption device communicating at least two message segments to a decryption device, the encryption system comprising:
means for chaining a data stream and the at least two message segments together into a chained message;
means for encrypting said chained message;
means for transmitting said encrypted chained message to the decryption device;
means for receiving said encrypted chained message at the decryption device; and
means for independently decrypting any segment of said encrypted chained message, without decrypting any other segment of said encrypted chained message.

9. The encryption system of claim 8, said means for decrypting further comprising:
means for determining an encryption state for at least one of the at least two encrypted message segments; and
means for decrypting said at least one of the at least two encrypted message segments by entering said encryption state followed by said at least one of the at least two encrypted message segments into the decryption device.

10. The encryption system of claim 9, wherein said means for determining further comprises:
means for setting up a holding register for said encryption state;
means for filling said holding register with data from said encrypted chained message received immediately prior to receiving said at least one of the at least two encrypted message segments; and
means for feeding contents of said holding register into the decryption device.

11. The encryption system of claim 9, said means for decrypting further comprising means for entering message bits, received after reception of said at least one of the at least two encrypted message segments, into the decryption device to recover decryption device throughput delay data.

12. The encryption system of claim 8, wherein the at least two encrypted message segments comprise encryption keys.

13. The encryption system of claim 8, further comprising means for generating said data stream by randomly selecting bits.

14. The encryption system of claim 8, said means for chaining further comprising means for placing said data stream and the at least two message segments for transmission in succession.

15. A communication unit having a decryption device for use in an encryption system having an encryption device communicating at least two message segments to the decryption device, the communication unit comprising:
means for receiving an encrypted chained message comprised of a data stream at the at least two message segments chained and then encrypted;
means for determining an encryption state for at least one of the at least two encrypted message segments; and
means for independently decrypting said at least one of the at least two encrypted message segments by entering said encryption state followed by said at least one of the at least two encrypted message segments into the decryption device, without decrypting any other segment of said encrypted chained message.

16. The communication unit of claim 15, said means for decrypting further comprising means for entering message bits, received after reception of said at least one of the at least two encrypted message segments, into the decryption device to recover decryption device throughput delay data.

17. The communication unit of claim 15, wherein said means for determining further comprises:
means for setting up a holding register for said encryption state;
means for filling said holding register with data from said encrypted chained message received immediately prior to receiving said at least one of the at least two encrypted message segments; and
means for feeding contents of said holding register into the decryption device.

18. The communication unit of claim 15, wherein the at least two encrypted message segments comprise encryption keys.

19. A key management controller having at least one decryption device for use in an encryption system wherein the at least one encryption device communicates at least two message segments to a decryption device, the key management controller comprising:
means for chaining a data stream and the at least two message segments together into a chained message;
means for encrypting said chained message; and
means for transferring said encrypted chained message to the decryption device, such that the decryption device independently decrypts any segment of said encrypted chained message, without decrypting any other segment of said encrypted chained message.

20. The key management controller of claim 19, further comprising means for generating said data stream by randomly selecting bits.

21. The key management controller of claim 19, said means for chaining further comprising means for placing said data stream and the at least two message segments for transmission in succession.

22. A method of communication of at least two message segments in an encryption system having an encryption device and a decryption device, comprising the steps of:
- generating a data stream by randomly selecting bits;
- chaining said data stream and the at least two message segments together into a chained message;
- encrypting said chained message;
- transmitting said encrypted chained message to the decryption device;
- receiving said encrypted chained message at the decryption device; and
- decrypting said encrypted chained message.

23. An encryption system having an encryption device communicating at least two message segments to a decryption device, the encryption system comprising:
- means for generating a data stream by randomly selecting bits;
- means for chaining said data stream and the at least two message segments together into a chained message;
- means for encrypting said chained message;
- means for transmitting said encrypted chained message to the decryption device;
- means for receiving said encrypted chained message at the decryption device; and
- means for decrypting said encrypted chained message.

* * * * *